Figure 1:
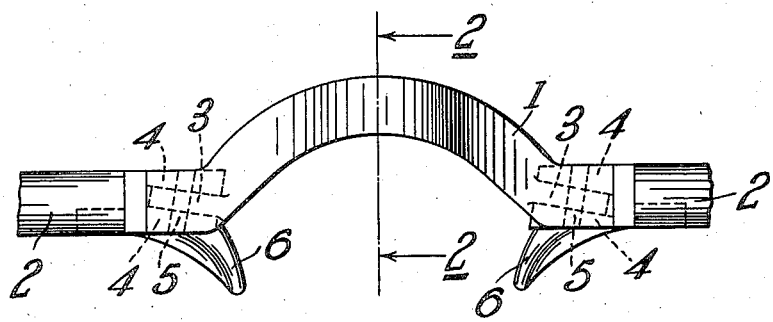

Dec. 15, 1936. W. D. EGLINTON 2,064,525
FOLDING SPECTACLES
Filed July 19, 1934

Patented Dec. 15, 1936

2,064,525

UNITED STATES PATENT OFFICE 2,064,525

FOLDING SPECTACLES

William David Eglinton, Croydon, England

Application July 19, 1934, Serial No. 736,095
In Great Britain July 31, 1933

2 Claims. (Cl. 88—44)

This invention relates to folding spectacles and has reference to folding spectacles of the kind described and claimed in the specification of my prior United States Letters Patent No. 1,970,079.

Spectacles constructed in accordance with my prior invention differ from spectacles of the same general type in that they have their eye pieces in precise alignment when in the open or extended position the desideration being attained by arranging the hinges by which the eye pieces are connected to the bridge or nose piece at suitable angles as described in the specification.

This prior arrangement has been found to operate satisfactorily in all cases where the eye-pieces and lenses are of any normal thickness, but there arise abnormal cases where the lenses are of exceptional thickness or curvature.

In such cases it has been found that the surfaces of the lenses which lie towards each other when the spectacles are folded are in actual contact and the continual operation of opening and closing causes these abutting surfaces to become scratched.

Further, in certain cases where the thickness of the lenses is abnormal or it is desired to provide wide placquets on the rims of the eye pieces the two eye pieces will not readily pass each other with the result that, in the closed position, there is a constant strain upon the bridge and eye pieces that may ultimately disturb the correct alignment of the eye pieces when open for use.

By the use of hinges in accordance with the present invention the distance between the eye pieces in the folded up position can be varied to suit any thickness or curvature of lenses or placquets. Moreover, in all folding spectacles with which I am familiar it is necessary to set one of the hinges back at a distance from the inner edge of the eye piece to permit one eyepiece, when in the folded up position to be close to the other. With the present construction both hinges can be attached to the eye pieces at the same relative positions and in the folded up position the fastening plate of one of the hinges acts as a rest or separator and positively prevents the two eye-pieces being pressed together in the folded up position.

The object of the present invention is to provide folding spectacles which will have the advantages of precise alignment when in use but with the hinges so arranged that the position of the two eye pieces when the spectacles are closed, is such that sufficient space is left between the opposing surfaces as to prevent contact in the closed position.

In order to accomplish this I arrange the hinges connecting the eye pieces to the bridge angularly in relation to the bridge both vertically and horizontally.

By angular relation of the hinge to the bridge vertically is to be understood that the dihedral angle between the faces of the hinge leaves of the hinge in question and the plane of that part of the bridge to which that hinge is attached is not a right angle and by angular relation of the hinge to the bridge horizontally is to be understood that the faces of the hinge leaves are set at an angle to the bridge when viewed at right angles to this plane.

According to this invention, therefore, in addition to each of the hinges being at an angle to the bridge when viewed at right angles to the plane of that part of the bridge to which the hinge in question is attached, as described in my prior specification above alluded to and more particularly as depicted in Figure 6 thereof, the hinge also lies at an angle when viewed parallel to the bridge and at right angles to the axis of the hinge. In order that the invention may be understood and carried into practice, reference is hereby made to the accompanying drawing, which illustrates to an enlarged scale the hinging elements of folding spectacles according to my invention.

Figure 2:
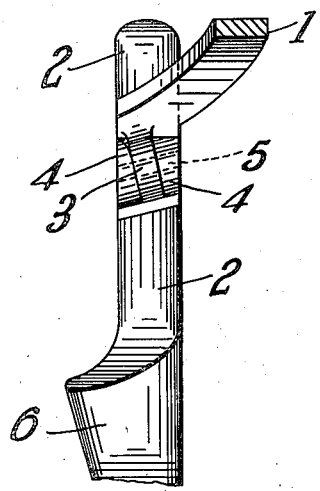

In this drawing Figure 1 is a plan view of the bridge of a folding spectacle with the eye-pieces hinged thereto and Figure 2 is a sectional elevation on the line 2—2 of Figure 1.

Referring to this drawing, the numeral 1 designates the bridge and 2 designates the eye pieces. The hinge leaves of the hinges are designated 3 and 4, the hinge leaf 3 being that carried by the bridge and 4 the hinge leaves carried by the fitments attached to the eye-pieces. The numeral 5 designates the hinge pins. It will be seen on reference to Figure 1 that the hinge lies at an angle to the bridge similarly to that shown in the drawing attached to my prior specification, but reference to Figure 2 shows that part of the bridge to which the hinge is attached, whereas in my earlier arrangement the hinge leaves of the hinge would appear parallel with that plane, as this second angularity was not contemplated.

It will be appreciated that while Figs. 1 and 2 illustrate in a general way the double angularity of the hinges relative to the bridge both vertically and horizontally which distinguishes this invention from the single horizontal angularity described and contemplated in my former specification, the full amount of these individual angularities can only be observed when viewed in the directions hereinbefore stated and by reference to which they are defined.

By this means, when the eye pieces of the spectacles are being folded towards each other, they move away from each other to a greater extent than when the single angle is used, thus at the point where one eye piece begins to pass over the other, the gap or space between the respective planes of the two eyepieces is considerably greater than in my previous construction, and there is less likelihood of contact in passing when abnormally thick lenses are used, or when thick placquets, such as are indicated at 6, are formed on the rims of the eye pieces.

Although I have shown placquets integral with the eye rims it will be understood that I may provide adjustable placquets carried upon members attached to the spectacle bridge or nose piece.

Approximately through half the distance of the closing movement the eye pieces turn towards each other, and occupy approximately the same relative position to each other when finally in the closed up position, but with the difference that the two angles that have been added, prevent the eyepieces coming to rest in close juxtaposition to each other, but at such a position that there is a gap or space between the planes of the two eyepieces sufficient to avoid the inner surfaces of abnormally thick lenses coming in contact.

According to the line of intersection of the second angle with the first angle on the ends of the bridge piece so the distance between the two eye-pieces when in the closed position can be determined.

In the open extended position the eye pieces are in perfect alignment with each other in all cases.

What I claim and desire to secure by Letters Patent is:—

1. In a folding spectacle, a rigid bridge arched in a plane substantially identical with the plane of the lenses when extended, a hinge leaf integral with the bridge at each end thereof lying in a plane slightly inclined to the plane of the lenses and also slightly inclined to that plane which is perpendicular to said plane and passes through the centers of the lenses, and an eye piece pivoted to each leaf for rotation about a pintle perpendicular to said leaf.

2. In a folding spectacle, a rigid bridge arched in a plane substantially identical with the plane of the lenses when extended, a hinge leaf integral with the bridge at each end thereof lying in a plane slightly inclined to the plane of the lenses and also slightly inclined to that plane which is perpendicular to said plane and passes through the centers of the lenses, and an eye piece pivoted to each leaf for rotation about a pintle perpendicular to said leaf, said eye pieces having placquets formed on the adjacent portions of their rims.

WILLIAM DAVID EGLINTON.